METHOD AND APPARATUS FOR RECORDING AND REPRODUCING COLOR IMAGES ON MONOCHROME FILM

The invention relates to color video recording/reproduction.

Using a system known as electronic video recording (EVR) monochrome video recording is accomplished with motion picture film by recording images thereon together with a magnetic sound stripe and a series of field synchronizing pulses which are usually common to two tracks on the same film. Reproduction generally proceeds by scanning of the recorded film using flying spot techniques, signals being generated in a photo voltaic cell arrangement for normal video processing.

It is an object of the invention to facilitate recording of color images without resorting to color film stock.

In a first aspect, the invention provides a method of recording color images on monochrome recording medium, wherein successive frames are recorded on successive areas along the length of the recording medium, and wherein, considering each such area as being composed of two parts of unequal width, luminance signals are recorded on the larger said parts of such areas, and a corresponding pair of color signal components are recorded on the smaller said parts of such areas.

In a second aspect, the invention provides a method of reproducing for recording media recorder by the first aspect, which method comprises line scanning each said area of the recording medium, sensing the results ofsaid scanning to produce separate signals corresponding to the two parts respectively of each said area and processing said separate signals to provide chrominance signals representative of red, green, and blue image components.

An important advantage that can be gained by utilization of the invention arises from the fact that the resolution capabilities of monochrome recording media are generally such that the width of the area required for the recorded image could be reduced by a factor of about a third and still be adequate. By doing this a strip of recording medium is left blank when the luminance component of a color video signal is recorded on the area of reduced width. The two color signal components in a television composite video signal generally require less than one quarter of the band width of the luminance signal component. These color signal components can therefore be recorded using the invention on the aforementioned blank strip. In this way, the reduced width and "blank" strips or areas correspond with the larger and smaller parts referred to in the first aspect of the invention, and it is possible to record color images on monochrome recording media without sacrificing playing time, i.e. two tracks may be recorded as with EVR processes.

Preferably, each of the color signal components is recorded in a different half of each such smaller part of a said area, such halves appearing sequentially with respect to the length of the recording medium. This spacial separation of color signal recordings is highly desirable using monochrome film stock as it is not possible, by simple means, to make a scanning beam used for reproduction follow individual recorded lines on the film, which lines are undesirable and are normally eliminated during recording by a spot wobbling process.

In a corresponding method of reproduction one half of the smaller part of a said area is scanned in successive lines on alternate line scans, the intervening line scans being directed at the other half of the smaller part of the same said area.

In a third aspect, the invention provides apparatus suitable for carrying out reproduction in accordance with the second aspect, which apparatus comprises a flying spot line scanner arrangement, two photoconductive sensing arrangements each operative in respect of signals from different said parts of each of the areas, and means for processing the outputs of the photo voltaic arrangements to provide signals representative of red, green and blue image components.

Preferably, where the color signal components are recorded in separate spaces, the line scanning arrangement is operative on alternate scans with respect to successive lines of scan of one half of one smaller said part and on intervening scans with respect to successive lines of scan of the other half of that one smaller said part by jumping a beam of the scanner by half a frame following each said alternate scan.

There may be included in the means for processing means for storing for the duration of one scan signals from that one of the photoconductive arrangement corresponding to the smaller parts of said areas, and gating means for the outputs of the said one photoconductive arrangements and the means for storing, the gating means being switchable at line scan rate to provide each colour signal component in a different corresponding one of two outputs.

Many advantages accrue where the colour signal components are color difference signals, for example, the amplification balance between the luminance component and the color signal components is not of fundamental importance as only changes in saturation result and not changes in white point. Also, registration problems for scanning during reproduction are not highly critical as the color signal components are of low bandwidth compared with the luminance component.

The principles on which the invention is based and one way of putting it into practice will now be described, by way of example, with reference to the drawings, wherein.

Figure 1:
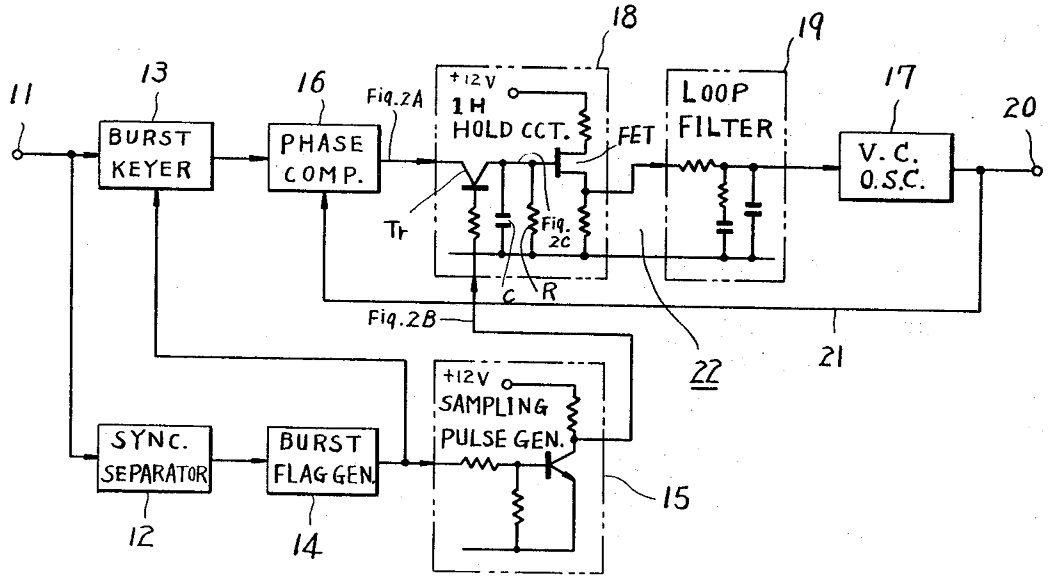
FIG. 1 is a diagrammatic representation of a section of film bearing monochrome video recordings in conventional manner.

FIG. 1 shows a section of monochrome film recorded in conventional EVR manner with two tracks of images. Down the center of the film are recordings of field synchronization pulses that are common to the two tracks. The image frames of each track are recorded between field synchronization pulses and on a different side thereof with the corresponding sound stripe close to the edge of the film.

In FIG. 2 simplified reproducing apparatus for the film of FIG. 1 is shown to include a flying spot tube FST and lens system L for line-scanning image frames of a film transported between two rollers R1 and R2. A Video signal is obtained from a photocell arrangement PCC on the other side of the film and is subsequently processed in conventional manner.

Figure 3:
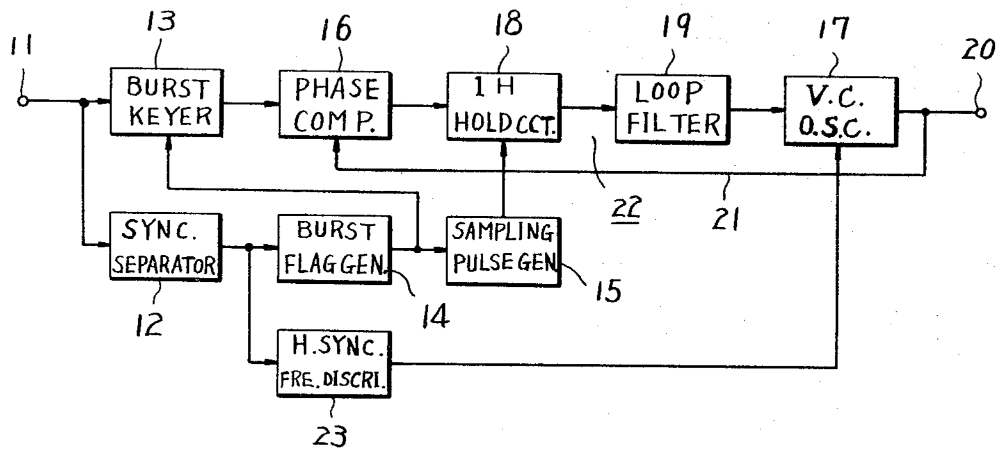
FIG. 3 is a diagrammatic representation of a section of film bearing one track of color recordings exemplifying this invention.

FIG. 3 shows on a section of film one track of a color recording embodying the invention. The color recording occupies the same width of the film as for one track of the monochrome recording of FIG. 1, with the video recording similarly disposed between a sound stripe and field synchronization pulses which may be common to a second track as with FIG. 1. In this case, however, the resolution capabilities of the film are exploited by recording the luminance component of the color image in a width of the film that is reduced compared with the width used for image recording in FIG. 1. In the resulting space between that luminance recording and the sound stripe, the two color difference components for instance U and V of the PAL system are recorded each in a different half of that free space as shown.

Figures 4, 5:
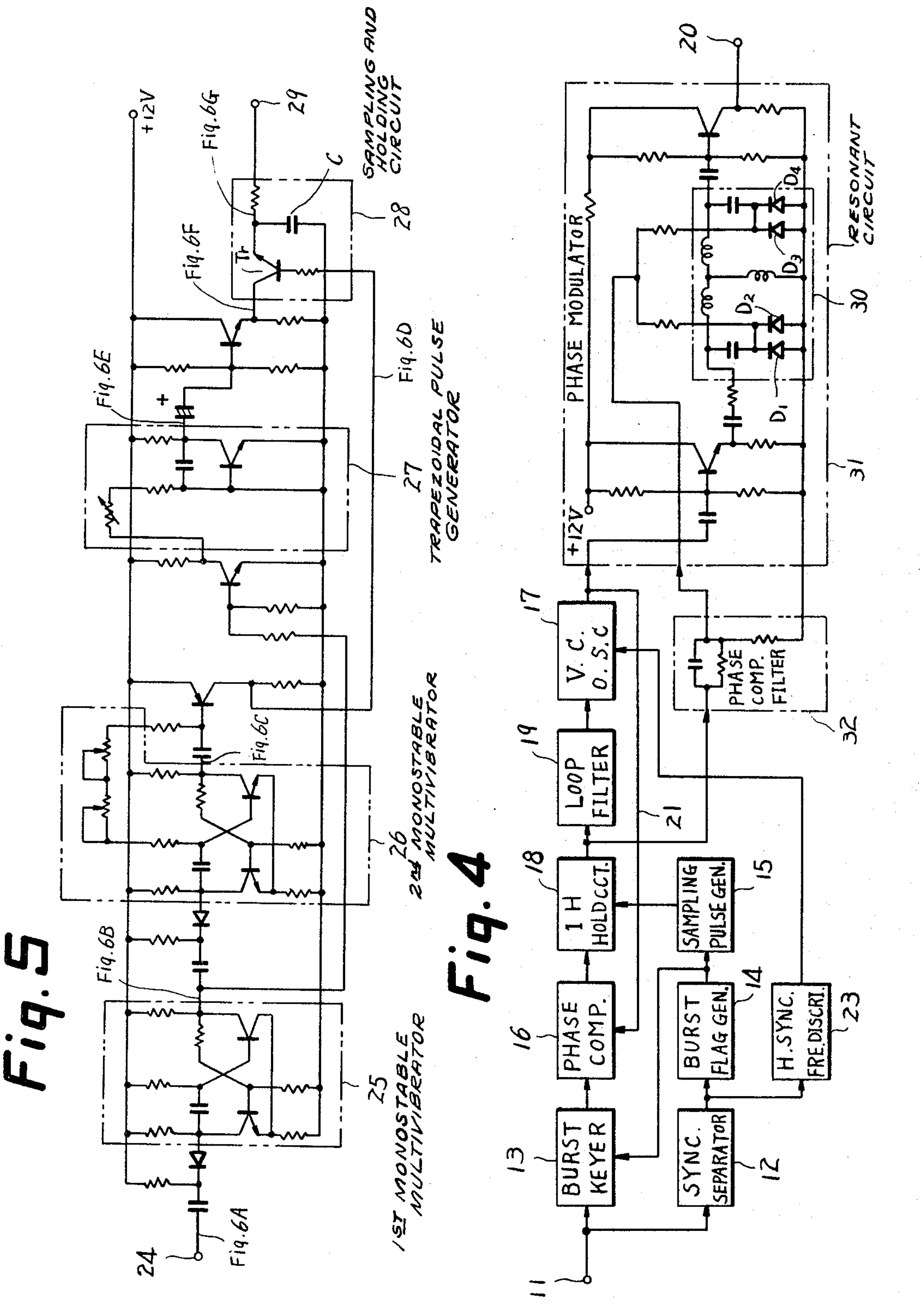
FIG. 4 is a diagrammatic representation to an enlarged scale of a part of the film of FIG. 3 and is useful in describing one application of this invention.
FIG. 5 is a diagrammatic representation of apparatus for recovering color signal components from signals derived from the film of FIGS. 3 and 4.

The video section of the recording of one frame is shown enlarged in FIG. 4 together with the lines on which it is scanned by flying spot techniques for reproduction. These scan lines are numbered in accordance with the order in which they are traversed. As can be seen successive traverses of the U color difference component take place on odd numbered

United States Patent [15] 3,659,040

Fujita [45] Apr. 25, 1972

[54] CONTROL SYSTEM FOR A COLOR SYNCHRONIZING SIGNAL OSCILLATOR IN A MAGNETIC RECORDING AND REPRODUCING APPARATUS

[72] Inventor: Mitsuo Fujita, Tokyo, Japan

[73] Assignee: Victor Company of Japan, Limited, Kanagawa-ku, Yokohama, Japan

[22] Filed: Sept. 29, 1969

[21] Appl. No.: 861,561

[30] Foreign Application Priority Data

Sept. 30, 1968 Japan....................................43/70245

[52] U.S. Cl.................178/5.4 CD, 178/504 SY, 178/69.5 F
[51] Int. Cl.........................................................H04n 9/44
[58] Field of Search.................178/5.4 SY, 69.5 CB, 5.4 CD, 178/69.5 R, 69.5 F

[56] References Cited

UNITED STATES PATENTS

| | | | |
|---|---|---|---|
| 2,853,545 | 9/1958 | Rennick | 178/5.4 SY |
| 3,528,026 | 9/1970 | Groendycke | 178/69.5 CB |
| 3,312,780 | 4/1967 | Hurst et al. | 178/5.4 CD |
| 3,507,983 | 4/1970 | Leman | 178/5.4 CD |

*Primary Examiner*—Robert L. Richardson
*Assistant Examiner*—George G. Stellar
*Attorney*—Louis Bernat

[57] ABSTRACT

A control system for a color synchronizing signal oscillator used with a magnetic color video signal recording and reproducing apparatus which prevents a color step out, when a color video signal having a timing variation is demodulated. In this system, the phases of a color burst signal of the color video signal and an output signal of a voltage control oscillator are compared with each other. A phase error voltage is produced corresponding to the phase difference between the two signals, and this voltage is sampled by sampling pulses. The sampled phase error voltage is held during one horizontal scanning period and then supplied to the voltage control oscillator to control its oscillation frequency so that color synchronization may be effected satisfactorily.

2 Claims, 14 Drawing Figures

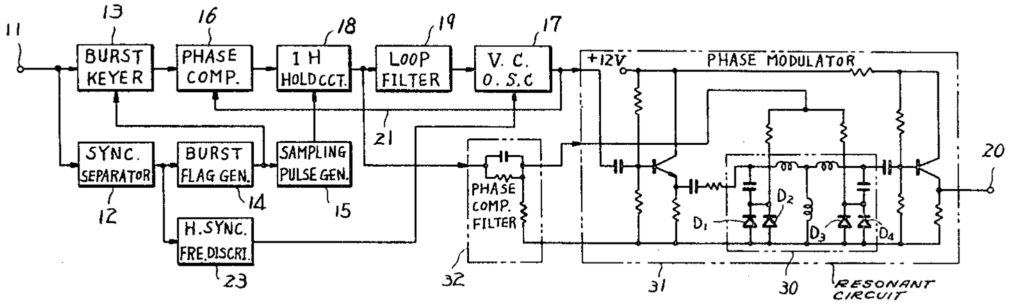

INVENTOR

MITSUO FUJITA

BY Louis Bernat

ATTORNEY

INVENTOR
MITSUO FUJITA
BY Louis Bernat
ATTORNEY

A CONTROL SYSTEM FOR A COLOR SYNCHRONIZING SIGNAL OSCILLATOR IN A MAGNETIC RECORDING AND REPRODUCING APPARATUS

This invention relates to improvements in control systems for a color synchronizing signal oscillator. More particularly, the invention is concerned with a control system for a color synchronizing signal oscillator adapted for use with a magnetic color video signal, recording and reproducing apparatus (hereinafter referred to as color VTR) for effecting color demodulation of reproduced color video signals which might have timing variations caused by variations in the rate of rotation of the rotary member used during the playback operation.

A number of different control systems for a color synchronizing signal oscillator have hitherto been employed with color television receiving sets. They include (1) a system in which a crystal filter is used for taking out a carrier wave component of 3.58 MHz, as desired, from a color burst signal containing a number of frequency modulated components, (2) one type of crystal filter system, which is referred to as an "injection lock" system, and (3) an oscillation system of the automatic phase control type (hereinafter referred to as APC type). These APC oscillators have a crystal oscillator in which a color burst signal and an output of the crystal oscillator of 3.58 MHz are applied to a phase discriminator. This produces an output corresponding to a difference between the two signals. The output is converted, through a suitable filter, into a voltage change of low frequency which is applied to the crystal oscillator through a reactance tube.

The aforementioned systems have a disadvantage in that they are not well adapted for use with known color VTR's in which color video signals of the NTSC system are recorded on and reproduced from a magnetic tape. When the color video signals recorded on such magnetic tape are reproduced, the reproduced color video signals might have timing variations which are caused by the differences between the rates of peripheral velocity of the drum at the time of recording and at the time of playback. Therefore, if any one of the systems is employed for effecting color demodulation of the reproduced color video signals, the color synchronizing might go wrong with respect to the color video signals; or color shading might be increased. In any case, these systems cannot be put to practical use in reproducing color video signals of the NTSC system from a color VTR.

To cope with this situation, new color burst lock oscillation systems have recently been developed for use with color VTR's. These systems include a "ringing" oscillator system and a "start-stop" oscillator system.

These systems both comprise a color burst lock oscillator of the type whose oscillation frequency is synchronous in phase with a color burst signal. The oscillation frequency is the natural frequency of the circuit.

Accordingly, if there is any difference between the natural frequency of the circuit and the frequency of a color burst signal, the frequency differential would be increased with time after the first color burst signal has been introduced. The output signals of the color burst lock oscillator are synchronized in phase with color burst signals, which are produced intermittently. Thus, the output signals of the color burst lock oscillator would finally have a large phase error. Actually, this phase error is represented by a color difference between the right and left portions of a picture on the monitor color television cathode-ray tube. Moreover, the oscillator of the type described lacks stability in operation and is unable to cope with timing variations of a high order.

The system according to this invention obviates these disadvantages of conventional color burst lock oscillation systems. According to the invention, there is provided a control system for a color synchronizing signal oscillator in which the phase of the color burst signal is compared with the phase of an output signal of a voltage control oscillator to produce an error voltage. This voltage is held during one horizontal scanning period to control the oscillation frequency of the voltage control oscillator. This produces a color synchronizing signal in agreement with a color burst signal which has a timing variation.

Accordingly, an object of the present invention is to provide a control system for a color synchronizing signal oscillator which is capable of following up, over a wide range at high speed, a reproduced color video signal which has a timing variation of relatively high order, so as thereby to effect color synchronization satisfactorily.

Another object of the invention is to provide a control system for a color synchronizing signal oscillator capable of following up a sudden variation in phase and frequency of the chrominance subcarrier of an input color video signal.

Further object of the invention is to provide a color burst control oscillation system which can eliminate a color difference occurring between the right and left side portions of a color picture on a color television receiving tube.

Still another object of the invention is to provide a control system for a color synchronizing signal oscillator which can be adjusted readily.

Still further object of the invention is to provide a control system for a color synchronizing signal oscillator which can have application in a color VTR of the double heterodyne system specifically used for effecting phase correction of chrominance signals.

Figures 2A, 2B, 2C:
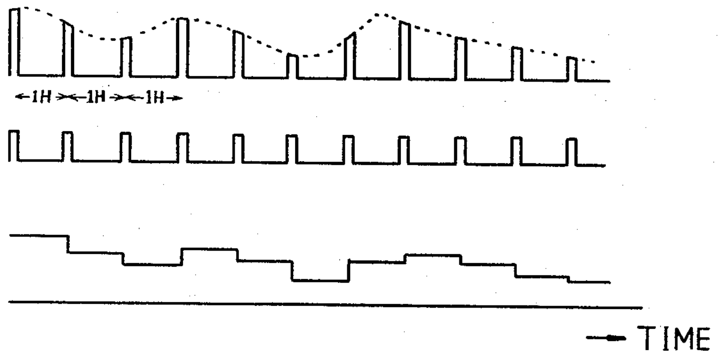
FIG. 2 is a diagrammatic representation of video signal recovery apparatus of a type commonly used for the film of FIG. 1.

Other objects as well as features and advantages of this invention will become evident from the description set forth hereinafter when considered in conjunction with the accompanying drawings, in which:

FIG. 1 is a block diagram of one embodiment of the system according to this invention;

FIG. 2A–2C show the wave forms of signals produced at essential portions of the block diagram of FIG. 1;

FIG. 3 is a block diagram of another embodiment of the system according to this invention;

FIG. 4 is a block diagram of still another embodiment of the system according to this invention;

FIG. 5 is a circuit diagram in explanation of an embodiment of a frequency discriminator shown in the block diagrams of FIGS. 3 and 4; and FIG. 6A–6G show the wave forms of signals produced in the circuit shown in FIG. 5.

A first embodiment of the system according to this invention will now be explained with reference to FIGS. 1 and 2.

First of all, a known color VTR will be explained. A VTR (not shown) comprises a cylindrical guide drum including a rotary member rotating in the center portion of the guide drum and mounting two magnetic recording and reproducing heads, for example, which are disposed in positions diametrically opposed to each other. A magnetic tape is moved around the peripheral surface of said guide drum in oblique wrap for the extent of over 180°. Thus, color television signals of the NTSC system, for example, can be recorded and reproduced by said two magnetic heads on said magnetic tape. Substantially one field or one frame of a color television signal is recorded in a sufficiently long magnetic track arranged obliquely with respect to the longitudinal axis of the magnetic tape.

When color video signals are recorded and reproduced by using a color VTR of the type described, the color video signals are liable to have timing variations due to irregularities of said rotary member or other causes.

Now, if the magnetic tracks of a combined color video signal of the NTSC system is scanned by the magnetic recording and reproducing heads, a reproduced color video signal can be provided.

The reproduced color video signal is applied to an input terminal 11 and simultaneously passed on to a synchronizing separator 12 on one hand and to a burst keyer 13 on the other. A synchronizing signal is separated from the color video signal at the synchronizing separator 12 and transmitted to a burst flag generator 14 where a burst flag is formed from the synchronizing signal.

The burst flag is supplied to the burst keyer 13 where it is used to gate a color video signal that has been supplied to the burst keyer 13, whereby a burst signal can be produced.

On the other hand, the burst flag is also supplied to a sampling pulse generator comprising a transistor and resistors, where sampling pulses are formed from the burst flag. The burst signal is supplied to a phase comparator 16 where the phase of the burst signal is compared with the phase of an output signal of a voltage control oscillator 17 having a center frequency which is substantially equal to the frequency (3.579545 MHz ≈ 3.58 MHz) of a chrominance subcarrier. The phase comparator 16 produces a phase comparison error signal which is a pulse signal of the wave form shown in FIG. 2A synchronous with the burst flag. The phase comparison error signal is produced only during the burst period.

The phase comparison error signal is sampled and held during one horizontal scanning period by sampling pulses of the H interval. The resulting wave form pulses of FIG. 2B are supplied from the sampling pulse generator 15 and are synchronous with the burst flag at a horizontal scanning period. Sampling occurs at a holding circuit 18 comprising a transistor Tr, resistor R and capacitor C. This sampling and holding operation is performed for each horizontal scanning period. That is, while the base voltage of transistor Tr is positively biased, the transistor Tr is turned on, so that the phase comparison error signal of FIG. 2A is supplied to the capacitor C to charge the same. As soon as the base voltage of transistor Tr is reduced to zero, the transistor Tr is turned off, with the phase comparison error signal being held during a horizontal scanning period until the next sampling pulse is supplied to the base of transistor Tr. Thus, a phase comparison error holding voltage of the wave form shown in FIG. 20 is produced.

After having its high frequency components removed at the one horizontal scanning period holding circuit 18, the phase comparison error holding voltage is passed through a buffer consisting of a field effect transistor (FET) and is supplied to a loop filter 19, having only a small phase delay comprising resistors and capacitors. Then, the phase comparison error holding voltage is supplied to the voltage control oscillator 17 as a control voltage for controlling the oscillation frequency of said oscillator 17. Thus, a color synchronizing signal agreeing with the color burst signal can be taken out through an output terminal 20.

As aforementioned, a circuit which holds a sampling phase comparison error signal during one horizontal synchronizing period is used as a low-pass filter for removing high frequency components therefrom. This is conducive to reduced phase delay. In general, the smaller the phase delay of a signal, the more increased is the loop gain in a loop filter.

With the increased loop gain, the drawing range of an oscillator can be increased, and the drawing time can be reduced. This permits the oscillation system according to this invention to cope with any sudden variation in the phase or frequency of the chrominance subcarrier of an input color video signal.

Generally, in the APC oscillation system, if the synchronizing in phase of the oscillation frequency with a burst signal is deviated by more than one horizontal scanning period, it is impossible to distinguish between synchronization at a normal frequency and synchronization at a frequency deviated from the normal frequency by one period.

Accordingly, a deviation of $$\frac{\frac{1}{3.58\text{ MHz.}}}{\frac{1}{15.75\text{ KHz.}}}\times 3.58\text{ MHz.}\doteqdot 15.75\text{ KHz.}$$

is a limit set to the following-up of the chrominance subcarrier. That is, 3.58 MHz ± ½ × 15.75 KHz is a maximum theoretical follow-up range for the chrominance subcarrier.

In the embodiment described, there is a 90° phase delay angle in a loop path 21 through which it is detected in accordance with a difference in phase between integrated values of frequencies is 90°. In the holding circuit 18, the phase delay angle when the frequency of a phase comparison difference signal is ½ × 15.75 KHz. The phase delay angle at the loop filter 19 is negligible because it is very small. Thus, the phase delay angle of a loop system circuit 22 is 180°. When this is the case, the loop system circuit 22 of this embodiment remains stable up to the maximum voltage ½ × 15.75 KHz of a phase comparison error signal at which the phase delay angle is 180°. It will be evident, therefore, that the system according to this invention can well follow a variation in the phase and frequency of a chrominance subcarrier. Thus, the system can cope with variations in the range (≈ 3.58 MHz) ± 8 KHz of the frequency of chrominance subcarrier.

The embodiment of a control system for a color synchronizing signal oscillator according to this invention described above can be used to handle reproduced color video signals of color VTR's provided with a capstan servo system.

Turning now to FIGS. 3, 5 and 6 which illustrate a second embodiment of this invention, like reference characters designate parts similar to the parts shown in FIG. 3 which illustrates the first embodiment of the invention. The detailed description of such similar parts is omitted here.

The second embodiment comprises a frequency discriminator 23 for horizontal synchronizing signals. The output signal is supplied from discriminator 23 to the voltage control oscillator 17 as a part of the control signal applied thereto. In this case, the sensitivity of the frequency discriminator 23 is adjusted such that, if a variation in the frequency of a chrominance subcarrier is X percent, then a variation in the frequency of the voltage control oscillator 17 which is controlled by an output of the frequency discriminator 23 is substantially X percent.

Figures 6A, 6B, 6C, 6D, 6E, 6F, 6G:
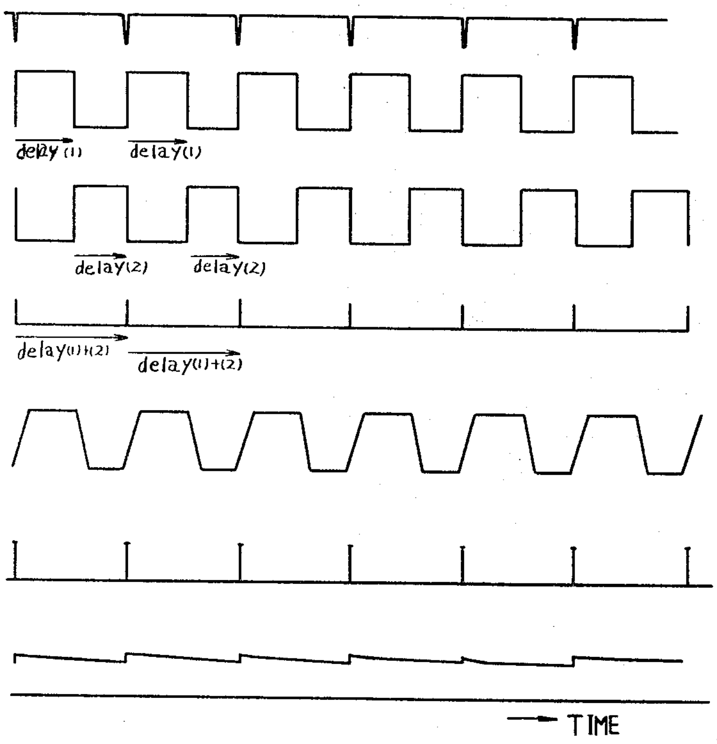

FIG. 5 is a circuit diagram showing the components of the frequency discriminator 23. A horizontal synchronizing signal of the wave form shown in FIG. 6A, separated from a color video signal at the synchronizing separator 12 shown in FIG. 3, is applied to an input terminal 24, shown in FIG. 5. The horizontal synchronizing signal is differentiated to produce trigger pulses which actuate a first monostable multivibrator, whereby a signal of the wave form shown in FIG. 6B can be produced. On one hand, the signal of the wave form shown in FIG. 6B is differentiated to produce trigger pulses which actuate a second monostable multivibrator 26, whereby a signal of the wave form shown in FIG. 6C can be produced. On the other hand, the signal of the wave form shown in FIG. 6B is amplified and the amplified signal is used to actuate a trapezoid generator 27, whereby a signal of the trapezoid wave form shown in FIG. 6E can be produced. This signal of trapezoid wave form which is used as a sampling signal is further amplified and supplied to a sampling and holding circuit 28, comprising a transistor Tr, capacitor C and resistor. The signal of the wave form shown in FIG. 6C is differentiated in the same manner to produce a signal of the wave form shown in FIG. 6D. This signal of the wave form of FIG. 6D, which is used as sampling pulses, is supplied to the sampling and holding circuit 28. As can be seen from FIGS. 6A to 6E, the aforementioned wave forms are related to one another in phase such that each sampling pulse is disposed in the forward inclined portion of a trapezoid wave.

The signal of the wave form shown in FIG. 6E is sampled by the sampling pulse of the wave form shown in FIG. 6D. Sampling occurs at the transistor Tr of the sampling and holding circuit 28. A sampled voltage, of the wave form shown in FIG. 6F, is produced and immediately supplied to the capacitor C to charge (hold) the same. Thus a holding voltage is produced, with the wave form shown in FIG. 6G. The holding voltage is taken out through a terminal 29, to be applied to the voltage control oscillator 17, using variable capacitors, for example. This holding voltage is shown in FIG. 3 as a control voltage.

The wave forms referred to hereinabove will be explained further in detail. It is evident that the sampling pulses shown in FIG. 6D have a predetermined time delay with respect to the horizontal synchronizing signals. (This is a time delay occurring at a first monostable multivibrator, plus a time delay oc-